V. RUSNAK.
COFFEE MILL AND SIFTER.
APPLICATION FILED JULY 6, 1921.
1,406,761.
Patented Feb. 14, 1922.
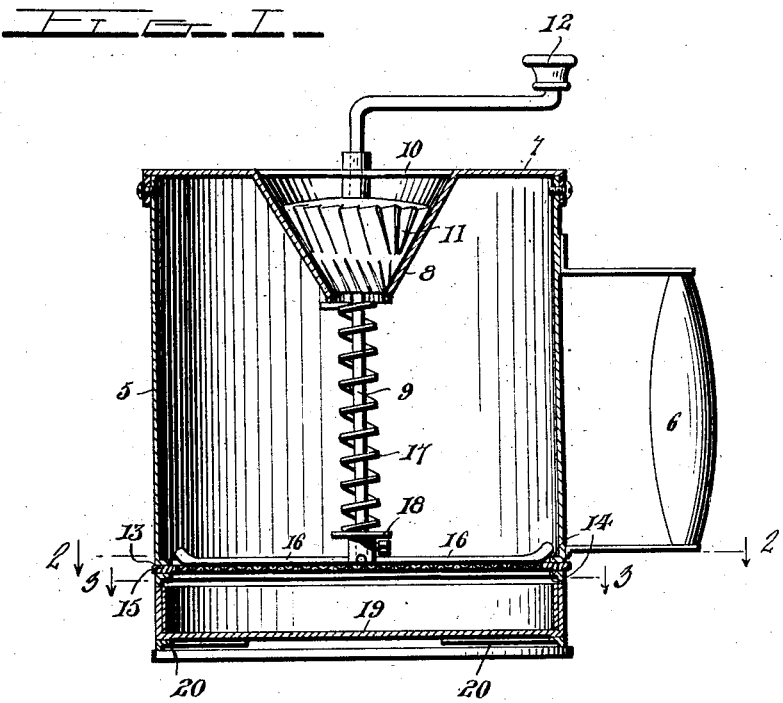
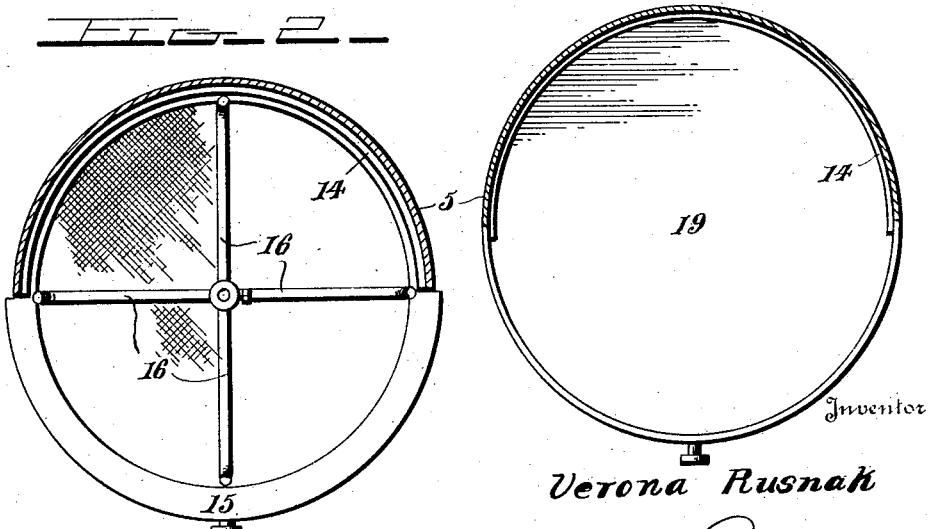
Inventor
Verona Rusnak
By F. K. Bryant
Attorney

UNITED STATES PATENT OFFICE.

VERONA RUSNAK, OF CLEVELAND, OHIO.

COFFEE MILL AND SIFTER.

1,406,761.                Specification of Letters Patent.      Patented Feb. 14, 1922.

Application filed July 6, 1921. Serial No. 482,680.

*To all whom it may concern:*

Be it known that I, VERONA RUSNAK, a citizen of the United States of America, residing at Cleveland, in the county of Cuyahoga and State of Ohio, have invented certain new and useful Improvements in Coffee Mills and Sifters, of which the following is a specification.

This invention relates to certain new and useful improvements in combination coffee mills and sifters and has particular reference to the provision of means operatively associated with a common operating handle for grinding coffee and for receiving the ground coffee as well as to separate the finer coffee from the coarser coffee in a continuous operation.

The primary object of the invention is to provide a combined coffee mill and sifter embodying simplicity of construction and a practical relationship of grinding and sifting elements whereby the grinding and sifting operations may be continuously and simultaneously performed.

With the above general objects in view and others that will appear as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a substantially central vertical sectional view of a combined coffee grinder and sifter constructed in accordance with the present invention, Figure 2 is a horizontal sectional view thereof taken upon line 2—2 of Fig. 1, and Figure 3 is a view similar to Fig. 2 taken upon line III—III of Fig. 1.

Referring more in detail to the several views, the invention embodies a portable combined coffee grinder and sifter adapted to be placed upon a table or other support and held by one hand while the grinding and sifting elements are operated with the other hand, and the construction includes a cylindrical casing 5 having a handle 6 fixed to one side thereof provided with a removable cover 7 which has its central portion directed inwardly in the form of a frusto-conical coffee grinder casing 8. A shaft 9 is vertically positioned axially of the casing 5 so as to extend centrally through the grinder casing 8 and this shaft is journaled for rotation in a cross bar 10 extending transversely of the opening through the cover 7, a grinding burr 11 being secured upon the shaft 9 within the grinder casing 8 and substantially conforming to the tapered shape of the latter as shown. The upper end portion of the shaft 9 is bent at right angles and has an upwardly directed handle at its free upper end as at 12 so as to provide a hand crank whereby the shaft may be conveniently manually rotated so as to cause the coffee to be ground between the wheel 11 and casing 8 as the coffee is fed through the opening in the cover 7.

The casing 5 is provided with a semi-circular slot 13 spaced from its bottom end and has a pair or spaced inwardly projecting flanges 14 of semi-circular form for the remaining portion of the casing 5 at points above and below the slot 13 so that a screen 15 may be horizontally slid into the slot 13 with its inner portion disposed between the flanges 14, the outer portion of the screen 15 being of slightly larger diameter as shown in Fig. 2 so as to project through the slot and to be supported between the walls of said slot so as to divide the casing 5 into upper and lower compartments. The shaft 9 extends downwardly to a point adjacent the screen 15 and is provided upon its lower end with a plurality of radial arms 16 which rotate with the shaft 9 for agitating the coffee on the screen and causing the finer particles of the coffee to be sifted through said screen into the lower compartment or chamber of the casing 5. The screen 15 preferably comprises a sheet metal ring with a circular sheet of reticulated fabric fastened therein, and the grinding burr 11 and agitating arms 16 are respectively yieldingly forced downwardly into engagement with the casing 8 and screen 15 by means of a helical compression spring which encircles the shaft 9 between the casing 8 and a washer or other abutment 18 carried by the lower end portion of the shaft 9. The casing 5 is provided with another slot below the slot 13 and somewhat wider than the latter slot but of similar form for removable reception of a drawer 19 for receiving the finer particles of coffee which pass through the screen 15 and for also receiving the coarser particles of coffee after the finer particles of coffee have been removed from said drawer upon removal of the screen 15. The casing 5 is provided with inwardly directed flanges as at 20 to serve as guides and as supports for the inner portion of the drawer when the latter is moved into position.

In operation, coffee is introduced through the central opening of the cover 5 in regulated quantities and the handle 6 is grasped in one hand while the handle 12 is operated with the other hand for rotating the shaft 9 together with the grinding burr 11 and agitator arms 16. The coffee passes between the grinding burr and its casing where it is ground into particles of various sizes that pass through the bottom of said casing onto the screen 15 and where it is agitated by the arm 16 for insuring passage of the finer particles into the drawer 19. When sufficient coffee has been ground, the drawer 19 is removed and the finer particles of coffee are removed from the drawer whereupon the latter is replaced in the casing 5. The screen 15 is then removed for allowing the remaining coarser particles of coffee to pass into the drawer 19 so that this coarser coffee may also be removed as desired. Should any unusual strain be placed upon the parts due to the entrance of hard grains of coffee or foreign matter between the parts 8 and 11 or between the arms 16 and screen 15, the entire rotatable structure of the device may yield upwardly against the action of the spring 17 and injury to the parts will thereby be prevented.

From the foregoing description it is believed that the construction and operation as well as the advantages of the present invention will be readily understood and appreciated by those skilled in the art.

Minor changes may be made in the invention without departing from the spirit and scope thereof as claimed.

What is claimed as new is:—

A combination coffee grinder and sifter embodying a casing having a cover provided with an inwardly projecting integral portion forming a grinder casing and having a cross bar transversely of the grinder casing, a removable screen in the casing beneath the grinder casing, a vertical shaft having agitator arms upon the lower end thereof disposed upon said screen and journaled for rotation centrally through the grinder casing and the said transverse cross bar, a handle upon the upper end of said shaft for rotating the agitator arms, spring means to yieldingly urge the shaft and agitator arms downwardly, and an abutment upon the shaft near the agitator arms, said spring encircling the shaft between the grinder casing and said abutment.

In testimony whereof I affix my signature.

VERONA RUSNAK.